US012689155B2

(12) United States Patent
Huang et al.

(10) Patent No.: US 12,689,155 B2
(45) Date of Patent: Jul. 21, 2026

(54) CONNECTING SUPPORT STANDS AND ELECTRONIC DEVICES

(71) Applicant: Hewlett-Packard Development Company, L.P., Spring, TX (US)

(72) Inventors: Chih Jen Huang, Taipei (TW); Chien Feng Chu, Taipei (TW); Chih Chien Chen, Taipei (TW); Hai Lung Hung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 281 days.

(21) Appl. No.: 18/561,609

(22) PCT Filed: May 28, 2021

(86) PCT No.: PCT/US2021/034830
§ 371 (c)(1),
(2) Date: Nov. 16, 2023

(87) PCT Pub. No.: WO2022/250693
PCT Pub. Date: Dec. 1, 2022

(65) Prior Publication Data
US 2024/0243522 A1 Jul. 18, 2024

(51) Int. Cl.
*H01R 13/631* (2006.01)
*H01R 13/24* (2006.01)
*H01R 13/62* (2006.01)

(52) U.S. Cl.
CPC ..... *H01R 13/6315* (2013.01); *H01R 13/2421* (2013.01); *H01R 13/6205* (2013.01)

(58) Field of Classification Search
CPC ............ H01R 13/6315; H01R 13/2421; H01R 13/6205; H01R 12/91
USPC .......................................... 439/39, 247, 248
See application file for complete search history.

(56) References Cited

U.S. PATENT DOCUMENTS 2,954,543 A * 9/1960 Rayer .................. H01R 13/629 439/248
4,853,830 A 8/1989 Corfits et al.
4,921,435 A 5/1990 Kane et al.
5,752,845 A * 5/1998 Fu ........................ B60N 2/5891 439/247

(Continued)

OTHER PUBLICATIONS

Amazon.com, Dell XPS 18 AIO Desktop Stand (JW2VY), 2021 pp. 8.

(Continued)

*Primary Examiner* — Gary F Paumen
(74) *Attorney, Agent, or Firm* — Quarles & Brady LLP

(57) ABSTRACT

In some examples, a connection apparatus includes a first connector assembly to engage with a second connector assembly, where the first connector assembly is included in one of a support stand and an electronic device, and the second connector assembly is included in another one of the support stand and the electronic device. The first connector assembly includes a floating connector block, an electrical contact on the floating connector block, and a biasing assembly engaged with the floating connector block to urge the floating connector block towards the second connector assembly when the second connector assembly is engaged with the first connector assembly to achieve a spring-loaded engagement of the electrical contact with an electrical contact of the second connector assembly.

18 Claims, 6 Drawing Sheets

(56) References Cited

U.S. PATENT DOCUMENTS

| | | | | |
|---|---|---|---|---|
| 6,242,691 | B1 | 6/2001 | Reese et al. | |
| 6,592,387 | B2 * | 7/2003 | Komenda | H01R 13/6315 439/247 |
| 7,090,521 | B2 * | 8/2006 | Nishio | H01R 13/6315 439/248 |
| 7,458,837 | B2 * | 12/2008 | Mineo | G01R 1/0416 439/248 |
| 7,922,510 | B2 * | 4/2011 | Klinger | H01R 13/6315 439/247 |
| 8,894,431 | B2 * | 11/2014 | Tiberghien | H01R 13/6315 439/247 |
| 10,498,061 | B1 * | 12/2019 | Blasick | H01R 24/50 |
| 10,522,927 | B2 * | 12/2019 | Yoshida | H01R 13/631 |
| 10,958,014 | B1 * | 3/2021 | Martin | H01R 13/6215 |
| 2007/0072442 | A1 | 3/2007 | Difonzo et al. | |
| 2020/0266582 | A1 * | 8/2020 | Held | H01R 13/6315 |

OTHER PUBLICATIONS

Cen Link Co., Ltd., B.C.E. Electronics, Pogo Pin Connector Application Introduction, Aug. 21, 2019 pp. 34.
Magnetic Pogo Pin 16P, 2021 pp. 3.
Magnetic Pogo Pin Connect, 2021 pp. 3.
Wikipedia, Pogo pin last edited on Mar. 15, 2021 pp. 4.
Yokowo, Catalog Products, Pogo Pin Connectors, 2021 pp. 4.

* cited by examiner

CONNECTING SUPPORT STANDS AND ELECTRONIC DEVICES

BACKGROUND

In some arrangements, electronic devices can be mounted on support stands for ease of use. An example of an electronic device is an all-in-one (AIO) computer, in which a display panel, a central processing unit (CPU), a memory device, and a persistent storage device (among other electronic components) are included in an integrated package. When mounted to the support stand, the AIO computer can be used as a desktop computer.

BRIEF DESCRIPTION OF THE DRAWINGS

Some implementations of the present disclosure are described with respect to the following figures.

Figure 1:
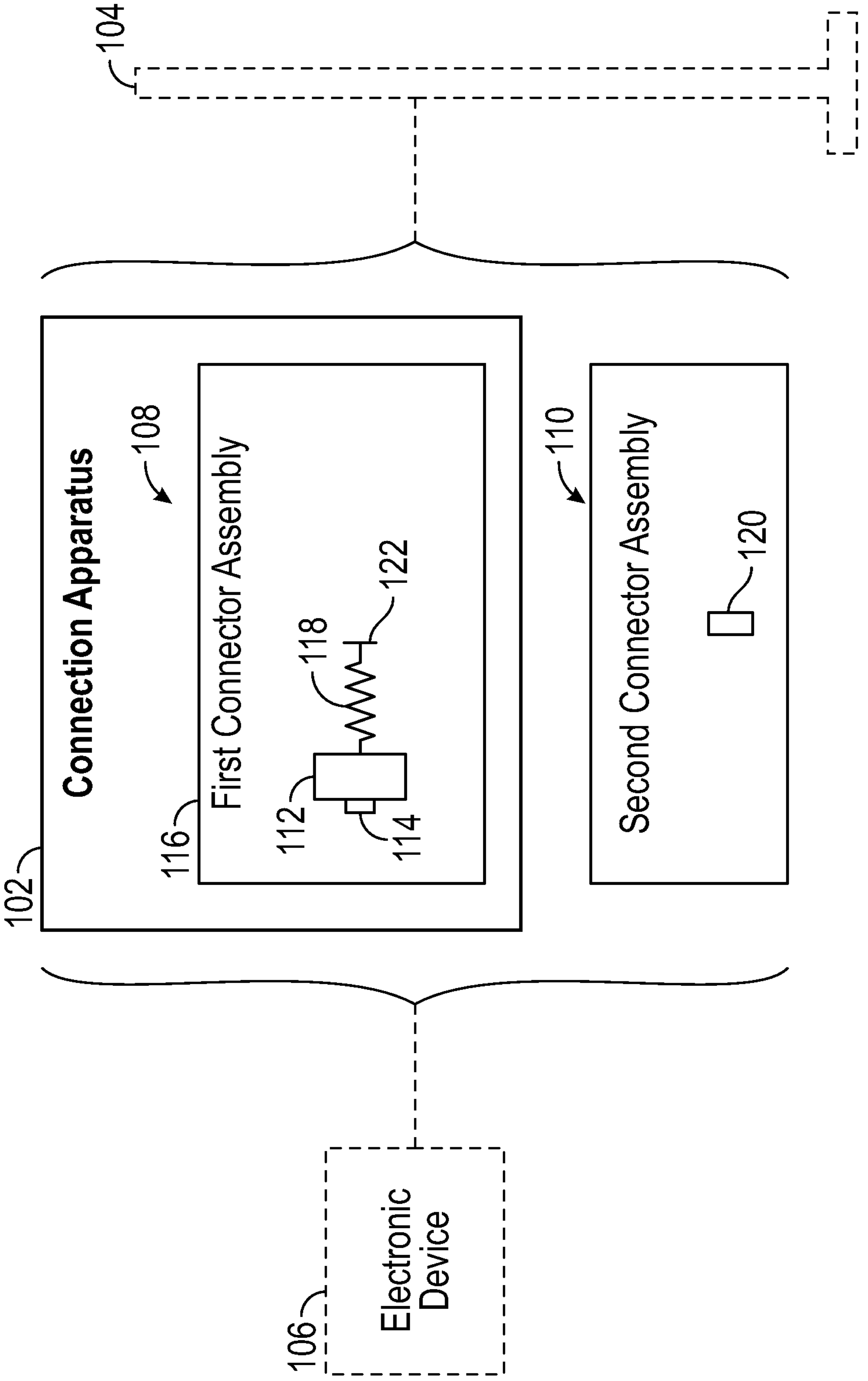
FIG. 1 is a block diagram of a connection apparatus according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "support stand" refers to a support structure that can be placed on the top surface of a desk, on a ground surface, or any other surface. The support stand has a mounting mechanism to attach an electronic device to the support stand. In some examples, an electronic device that can be mounted to a support stand can include an all-in-one (AIO) computer. In other examples, an electronic device that can be mounted to a support stand can include a display device, or another type of electronic device.

In some examples, the mounting mechanism to mount an electronic device to a support stand can include screws or other attachment elements that are manipulated using tools to attach or detach an electronic device to or from the support stand. Using a tool to attach or detach an electronic device to or from a support stand is inconvenient and can be time-consuming.

Also, in some cases, a support stand can include an electronic component that is to be powered by or is to electrically communicate with an electronic device mounted to the support stand. The support stand includes a stand connector assembly to electrically engage with a device connector assembly of an electronic device that is to be mounted on the support stand. The electronic component of the support stand is electrically connected to the stand connector assembly, such that the electronic component is able to receive power from and/or electrically communicate with the electronic device mounted to the support stand.

If the stand connector assembly and the device connector assembly are not properly aligned or do not properly engage with one another, an unreliable electrical connection may be established between the stand connector assembly and the device connector assembly.

Also, if excessive force is applied in attempting to better engage the device connector assembly with the stand connector assembly, damage to the stand connector assembly and/or device connector assembly may result.

In accordance with some implementations of the present disclosure, as shown in FIG. 1, a connection apparatus 102 is provided to establish an electrical connection between a support stand 104 and an electronic device 110. Note that the connection apparatus 102 can be included in the support stand 104 or the electronic device 106. Generally, the connection apparatus 102 allows for the establishment of a user-friendly and reliable mechanical and electrical connection between the support stand 104 and the electronic device 110.

The connection apparatus 102 includes a first connector assembly 108 to engage with a second connector assembly 110. In some examples, the first connector assembly 108 is part of the support stand 104. In other examples, the first connector assembly 108 is part of the electronic device 106. Generally, the first connector assembly 108 is included in one of the support stand 104 and the electronic device 106, and the second connector assembly 110 is included in the other one of the support stand 104 and the electronic device 106. Thus, if the first connector assembly 108 is part of the support stand 104, then the second connector assembly 110 is part of the electronic device 106. On the other hand, if the first connector assembly 108 is part of the electronic device 106, then the second connection assembly 110 is part of the support stand 104.

A "connector assembly" can refer to an assembly of a mechanical structure and an electrical structure to establish a mechanical connection and an electrical connection between the support stand 104 and the electronic device 106.

The first connector assembly includes a floating connector block 112 and an electrical contact 114 on the floating connector block 112. A "floating connector block" refers to a support structure that is not fixedly attached to a housing 116 of the first connector assembly 108, but rather, is translatable relative to the housing 116 of the first connector assembly 108. The floating connector block 112 can be formed of a rigid material, such as a metal, a hard plastic, and so forth.

A biasing assembly 118 is engaged with the floating connector block 112 to urge the floating connector block 112 towards the second connector assembly 110 when the second connector assembly 110 is engaged with the first connector assembly 108 to achieve a spring-loaded engagement of the electrical contact 114 with an electrical contact 120 of the second connector assembly 110.

In further examples, the first connector assembly 116 can include multiple electrical contacts mounted on the floating connector block 112 to engage respective electrical contacts of the second connector assembly 110.

The biasing assembly 118 can include a spring or another elastic material. The biasing assembly 118 has first end 122 fixed with respect to the housing 116 of the first connector assembly, and a second end 124 attached to a first side of the floating connector block 112. The first side of the floating connector block 112 is opposite a second side of the floating connector block 112 on which the electrical contact 114 is mounted.

In an example, the electrical contact 114 on the floating connector block 112 can be a pogo pin that has a portion that is biased by a spring toward an extended position of the pogo pin. When the pogo pin is engaged with another electrical contact, such as the electrical contact 120 of the second connector assembly 110, the engagement causes the spring-loaded portion of the pogo pin to be retracted by some amount, to improve the electrical engagement between the pogo pin and the other electrical contact.

In other examples, the electrical contact 114 is not a spring-loaded electrical contact. Rather, the electrical contact 120 of the second connector assembly 110 can be spring-loaded (e.g., in the form of a pogo pin) to engage with the electrical contact 114 of the first connector assembly 108.

In some examples, the housing 116 of the first connector assembly 108 defines a chamber to slidably receive the second connector assembly 110.

Figure 2B:
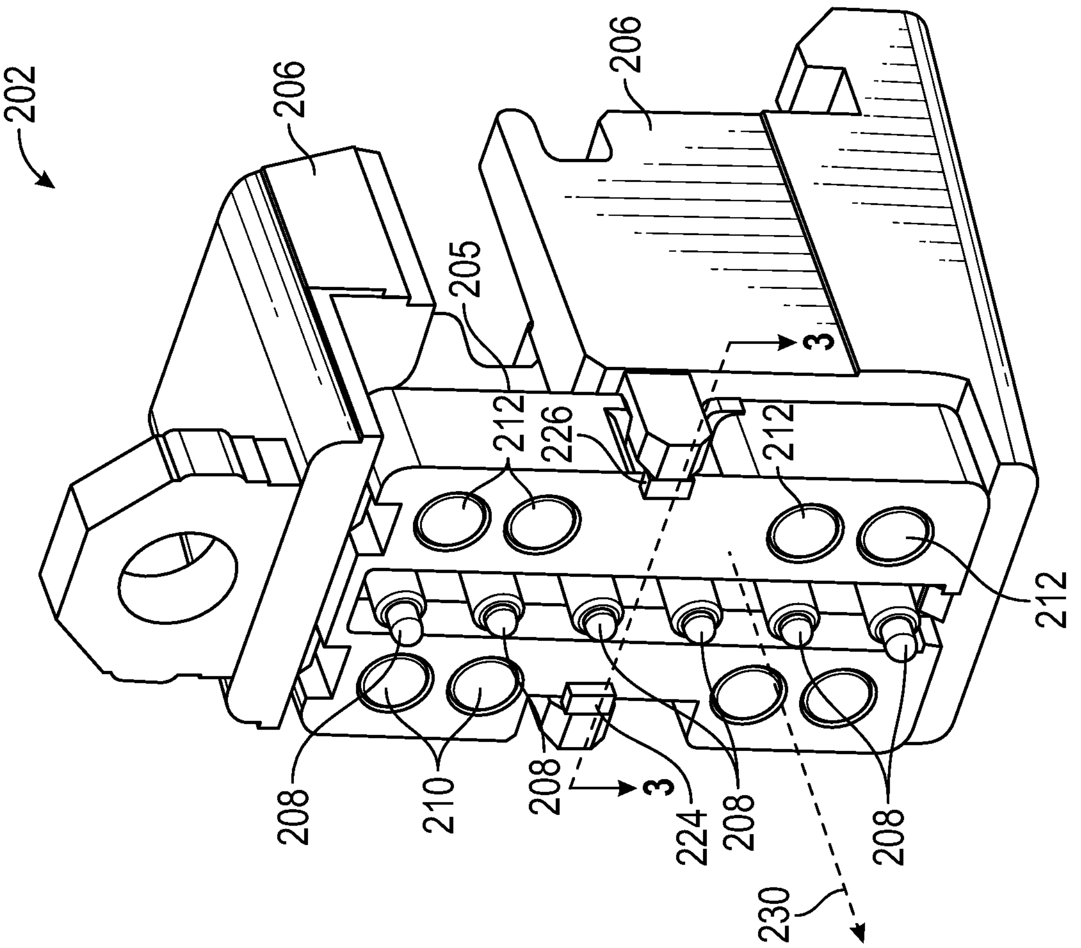
FIGS. 2A and 2B illustrate, respectively, a device connector assembly and a stand connector assembly, according to some examples.
Figure 2A:
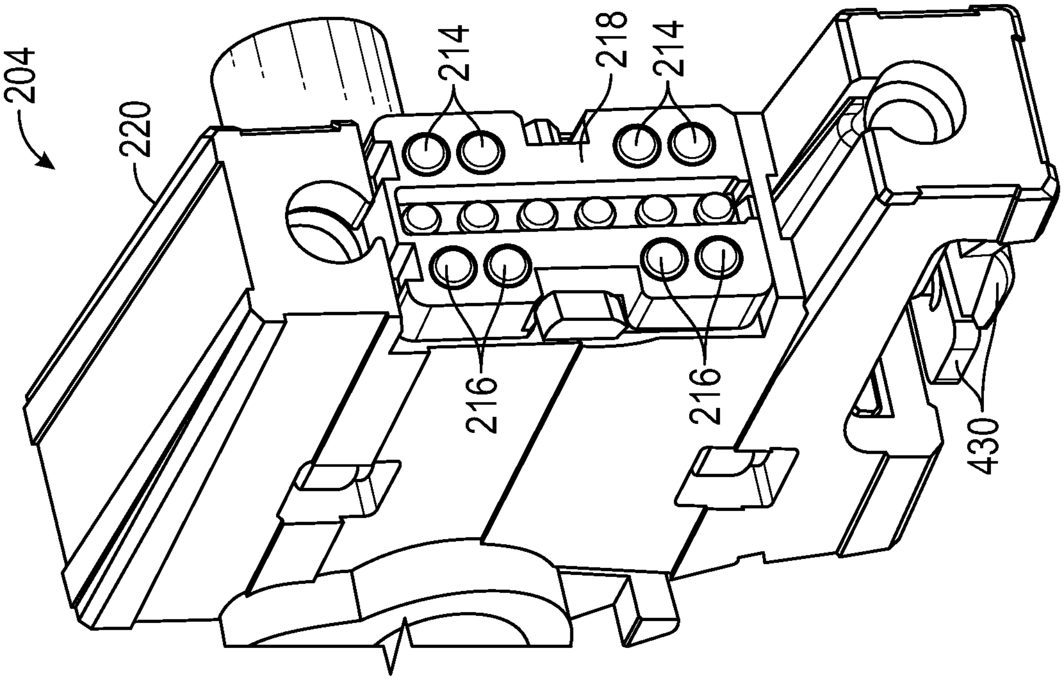

FIGS. 2A and 2B illustrate, respectively, a device connector 204 and a stand connector 202. The stand connector 202 is part of a support stand (e.g., 104 in FIG. 1), and the device connector 204 is part of an electronic device (e.g., 106 in FIG. 1).

The stand connector 202 in some examples can be part of the first connector assembly 108 of FIG. 1, and the device connector 204 in some examples can be part of the second connector assembly 110 of FIG. 1.

The stand connector 202 includes a floating connector block 205, which is an example of the floating connector block 112 of FIG. 1. The stand connector 202 includes a connector housing 206 that partially encloses the floating connector block 205. A number of pogo pins 208 (or more generally, spring-loaded electrical contacts) are mounted on the floating connector block 205. Although FIG. 2A shows multiple pogo pins 208 on the floating connector block 205, in other examples, just one pogo pin 208 may be mounted on the floating connector block 205.

In some examples, magnets 210 and 212 are also mounted on the floating connector block 205. In the example of FIG. 2A, a first collection of magnets 210 is provided on the left side of the pogo pins 208, and a second collection of magnets 212 is arranged on the right side of the pogo pins 208.

The magnets 210 and 212 are to magnetically attract corresponding magnetically attractable elements 214 and 216 on a connector block 218 of the device connector 204. In some examples, the connector block 218 can be formed of a rigid material and is fixed with respect to the housing 220 of the device connector 204; i.e., unlike the floating connector block 205 that is moveable relative to the housing 206 of the stand connector 204, the connector block 218 of the device connector 204 is not moveable relative to the housing 220 of the device connector 204.

In alternative examples, the connector block 218 of the device connector 204 can also be a floating connector block that is moveable by a biasing assembly (not shown) relative to the housing 220 of the device connector 204.

The magnetically attractable elements 214 and 216 can be magnets that have an opposite magnetic polarity as the respective magnets 210 and 212. Alternatively, the magnetically attractable elements 214 and 216 can include metallic materials that are magnetically attractable to the magnets 210 and 212.

In other examples, magnets can be provided on the connector block 218 of the device connector 204, and magnetically attractable elements can be provided on the floating connector block 205 of the stand connector 202.

Although FIGS. 2A and 2B illustrate the magnets 210 and 212 and magnetically attractable elements 214 and 216 as having generally circular shapes, in other examples, the magnets 210 and 212 and magnetically attractable elements 214 and 216 can have other shapes, such as rectangular shapes, triangular shapes, and so forth.

The device connector 204 includes a housing 220 that houses the connector block 218. The electrical contacts 222 are mounted on the connector block 218. The pogo pins 208 of the stand connector 202 are to electrically engage with the respective electrical contacts 222 of the device connector 204.

In some examples, the electrical contacts 222 of the device connector 204 are not spring-loaded (e.g., the electrical contacts 222 are not pogo pins), but rather are fixed and do not move relative to the connector block 218. In contrast, the pogo pins 208 on the floating connector block 205 of the stand connector 202 have spring-loaded portions that move when engaged with the respective electrical contacts 222 of the device connector 204.

In alternative examples, the electrical contacts 222 of the device connector 204 can also be spring-loaded electrical contacts, such as pogo pins, to engage with the pogo pins 208 of the stand connector 202. In further alternative examples, the electrical contacts 222 of the device connector 204 are spring-loaded electrical contacts, but the electrical contacts on the floating connector block 205 of the stand connector 202 are not spring-loaded.

As further shown in FIG. 2B, hooks 224 and 226 are attached to the housing 206 of the stand connector 202. In some examples, the hooks 224 and 226 are integrally attached to the housing 206 (i.e., the hooks 224 and 226 are formed together with the housing at 206). In other examples, the hooks 224 and 226 are separate pieces that can be attached to the housing 206.

The hooks 224 and 226 provide stops to engage and restrict translational motion of the floating connector block 205 past the hooks 224 and 226. As discussed further below, the floating connector block 205 is urged by a biasing assembly (e.g., 118 in FIG. 1 with further examples depicted in FIGS. 3A and 3B) in a direction 230 towards the connector block 218 of the device connector 204 when the device connector 204 is brought into engagement with the stand connector 202. The hooks 224 and 226 stop movement of the floating connector block 205 past the hooks 224 and 226 once the floating connector block 205 touches surfaces of the hooks 224 and 226.

Figure 3A:
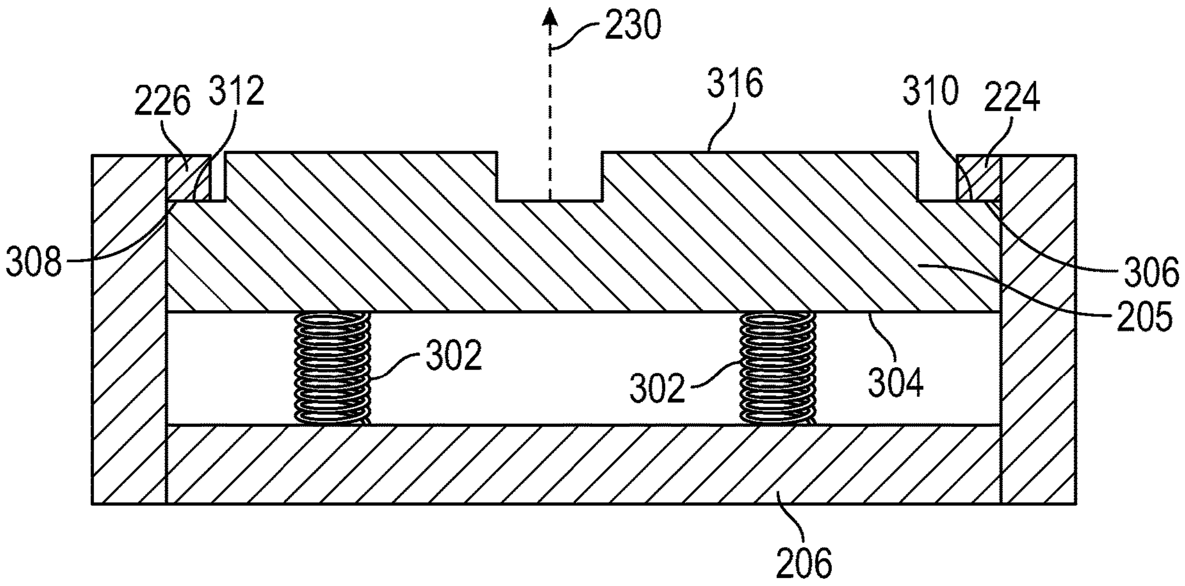
FIGS. 3A and 3B are cross-sectional views of different examples of a stand connector assembly, according to some examples.
Figure 3B:
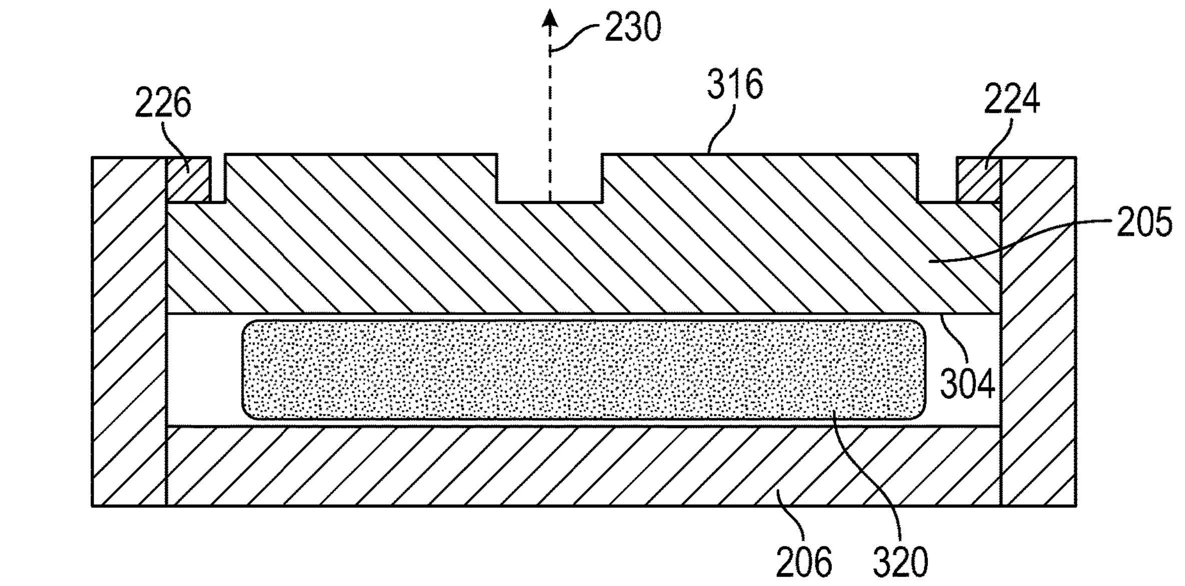

Cross-sectional views of the hooks 224 and 226 and the floating connector block 205 are shown in FIGS. 3A and 3B. The cross-sectional view of FIG. 3A or 3B is taken along section 3-3 of FIG. 2B.

FIG. 3A shows a biasing assembly including springs 302 that push a rear surface 304 of the floating connector block 205. The springs 302 apply a biasing force to urge the floating connector block 205 towards the hooks 224 and 226 along the direction 230.

The floating connector block 205 has engagement surfaces 306 and 308 that when engaged with respective engagement surfaces 310 and 312 of the hooks 224 and 226, respectively, stops further translation of the floating connector block 205 along the direction 230.

A force is applied against a front surface 316 of the floating connector block 205 that overcomes the biasing force of the springs 302 can cause the floating connector block 205 to be pushed rearwardly (in a direction opposite the direction 230) to compress the springs 302. The force applied against the front surface 316 of the floating connector block 205 may be from the connector block 218 of the device connector 204 when the connector block 218 is brought into engagement with the floating connector block 205.

FIG. 3B shows a different example in which the biasing assembly is in the form of an elastic member 320. The elastic member 320 can be formed of a compressible material, such as an elastomer, a porous material, and so forth. The elastic member 320 can be compressed such that the elastic member 320 applies a biasing force against the rear surface 304 of the floating connector block 205 to urge the floating connector block 205 in the direction 230. Force applied to the front surface 316 of the floating connector block 205 can cause the floating connector block 205 to move rearwardly to further compress the elastic member 320.

Figure 4A:
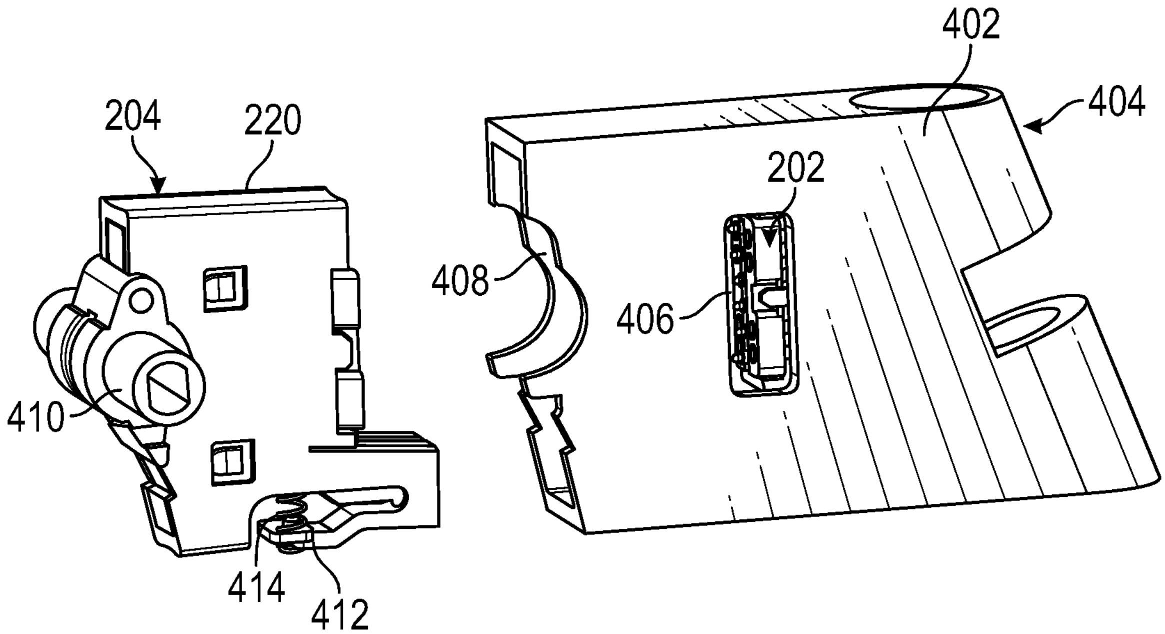
FIG. 4A illustrates a device connector and a stand connector assembly prior to engagement, in accordance with some examples.

As further shown in FIG. 4A, the stand connector 202 is contained within an external housing 402 of a stand connector assembly 404. An opening 406 is provided in a side surface of the external housing 402 of the stand connector assembly 404, through which the stand connector 202 is visible. In other examples, the opening is 406 omitted.

The external housing 402 of the stand connector assembly 404 defines an inner chamber 408. The housing 220 of the device connector 204 is slidable into the inner chamber 408 of the external housing 402 of the stand connector assembly 404.

Figure 4B:
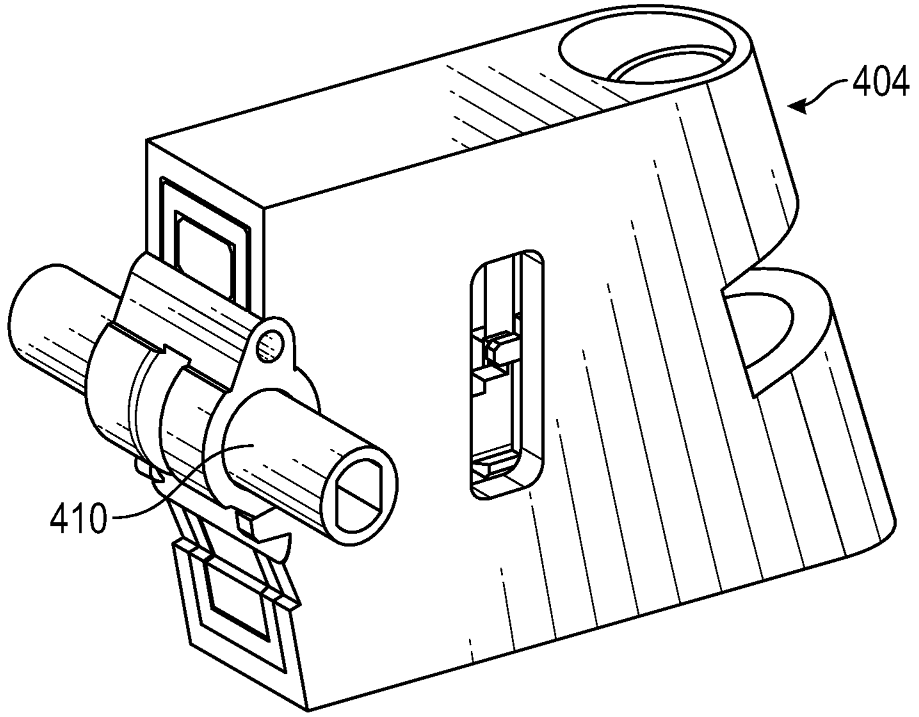
FIG. 4B illustrates the device connector of FIG. 4A engaged inside the stand connector assembly, in accordance with some examples.

FIG. 4B shows the device connector 204 fully inserted into the inner chamber 408 of the external housing 402 of the stand connector assembly 404. As shown in FIGS. 4A and 4B, a rear portion of the device connector 204 has a handle 410 that a user can grip to insert the device connector 204 into the inner chamber 408 of the stand connector assembly 404. The insertion of the device connector 204 into the inner chamber 408 of the stand connector assembly 404 causes engagement of the connector block 218 of the device connector 204 with the floating connector block 205 of the stand connector 202, to establish an electrical connection between the device connector 204 and the stand connector 202.

To disengage the device connector 204 from the stand connector assembly 404, a user can grip the handle 410 of the device connector 204 to slide the device connector 204 out of the inner chamber 408 of the stand connector assembly 404.

Although FIGS. 4A and 4B show an example in which the device connector 202 is inserted into the inner chamber 408 of the stand connector assembly 404, in a different example, the stand connector 202 can be inserted into an inner chamber of a device connector assembly that includes the device connector 204.

As further shown in the FIG. 4A, the device connector 204 has a locking feature 412 that is to lockingly engage a corresponding locking feature of the stand connector assembly 404. The locking feature 412 is biased downwardly (in the view of FIG. 4A) by a biasing element, such as a spring 414.

Figure 4C:
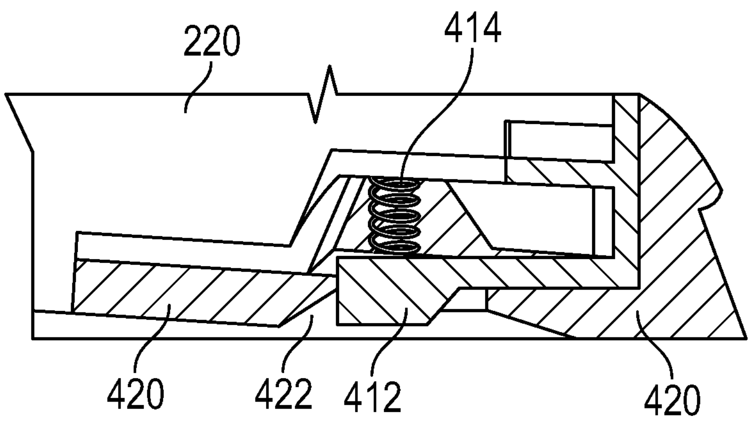
FIG. 4C is a side view of locking engagement between a locking feature and a locking slot, according to some examples.

As further shown in FIG. 4C, when the device connector 204 is received inside the stand connector assembly 404 such as shown in FIG. 4B, the locking feature 412 of the device connector 204 protrudes into a locking slot 422 defined by a housing structure 420 inside the external housing 402 of the stand connector assembly 404. The spring 414 biases the locking feature 412 downwardly (in the view of FIG. 4C) into the locking slot 422.

When the locking feature 412 is engaged in the locking slot 422, the device connector 204 is locked to the stand connector assembly 404 to prevent disengagement of the device connector 204 from the stand connector assembly 404.

As shown in FIG. 2A, the device connector 204 has a release tab 430 that is engaged to the locking feature 412. In some examples, a user can push upwardly on the lower side of the release tab 430, to move the release tab 430 upwardly. The upward movement of the release tab 430 causes a corresponding upward movement of the locking feature 412 against the biasing force applied by the spring 414. Once the locking feature 412 has moved upwardly by a distance to allow the locking feature to clear the locking slot 422 (an unlocked position), the user can pull on the handle 410 of the device connector 204 to disengage the device connector 204 from the stand connector assembly 404 and slide the device connector 204 out of the inner chamber 408 of the stand connector assembly 404.

In other examples, the locking feature 412 can be part of the stand connector assembly 404, and the locking slot 422 can be part of the device connector 204. More generally, a first connector assembly includes a locking feature to lockingly engage with a locking feature of a second connector assembly, and the locking feature of the first connector assembly is releasable from the locking feature of the second connector assembly responsive to actuation of a release tab.

Figure 5:
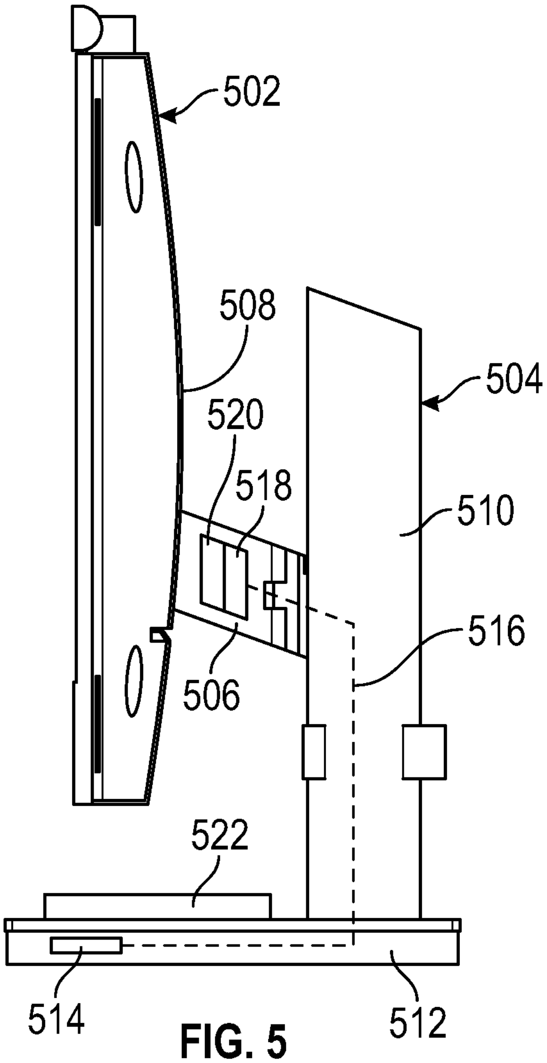
FIG. 5 illustrates an arrangement including an electronic device mounted to a support stand, according to some examples.

FIG. 5 shows an example arrangement that includes an electronic device 502 mounted to a support stand 504 by a mounting structure 506. The electronic device 502 can be an AIO computer or another type of electronic device.

A rear surface 508 of the electronic device 502 is attached to a first end portion of the mounting structure 506. A second end portion of the mounting structure 506 is attached or is part of the support stand 504. In some examples, the attachment between the electronic device 502 and the mounting structure 506 is a pivoting attachment to allow pivoting of the electronic device 502 with respect to the support stand 504.

The support stand 504 has a vertical support member 510 and a base 512. In some examples, the base 512 includes a wireless charger 514, which can be electrically connected by an electrical wire 516 to a stand connector assembly 518 (e.g., similar to 108 or 404). The stand connector assembly 518 is in turn engaged to a device connector assembly 520 (e.g., similar to 110 or 204).

Power is provided to the wireless charger 514 from a power supply in the electronic device 502 through the device connector assembly 520 and the stand connector assembly 518. As shown in FIG. 5, a handheld device 522 or another device can be placed on a surface of the base 512 to be charged wirelessly by the wireless charger 514.

In other examples, the wireless charger 514 can be replaced with a wired charger to charge the handheld device 522 or another device. An "electrical charger" can refer to either the wireless charger 514 or the wired charger.

In other examples, instead of the wireless charger 514, different types of electronic components can be provided in the stand 504, and the electronic components are able to communicate either power or electrical signaling with the electronic device 502 through the stand connector assembly 518 and the device connector assembly 520.

Figure 6:
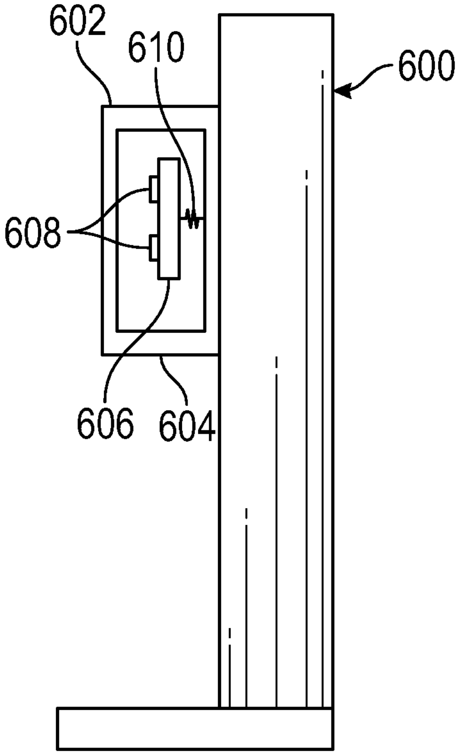
FIG. 6 is a block diagram of a support stand according to some examples.

FIG. 6 is a block diagram of a support stand 600 that includes a mount support 602 to detachably mount an electronic device. The support stand 600 further includes a stand connector assembly 604 to engage with a device connector assembly of the electronic device. The stand connector assembly 604 includes a floating connector block 606 and spring-loaded electrical contacts 608 on the floating connector block 606.

The stand connector assembly 604 further includes a biasing assembly 610 engaged with the floating connector block 606 to urge the floating connector block 606 towards the device connector assembly when the device connector assembly is engaged with the stand connector assembly 604 to achieve an engagement of the spring-loaded electrical contacts 608 with respective electrical contacts of the device connector assembly.

Figure 7:
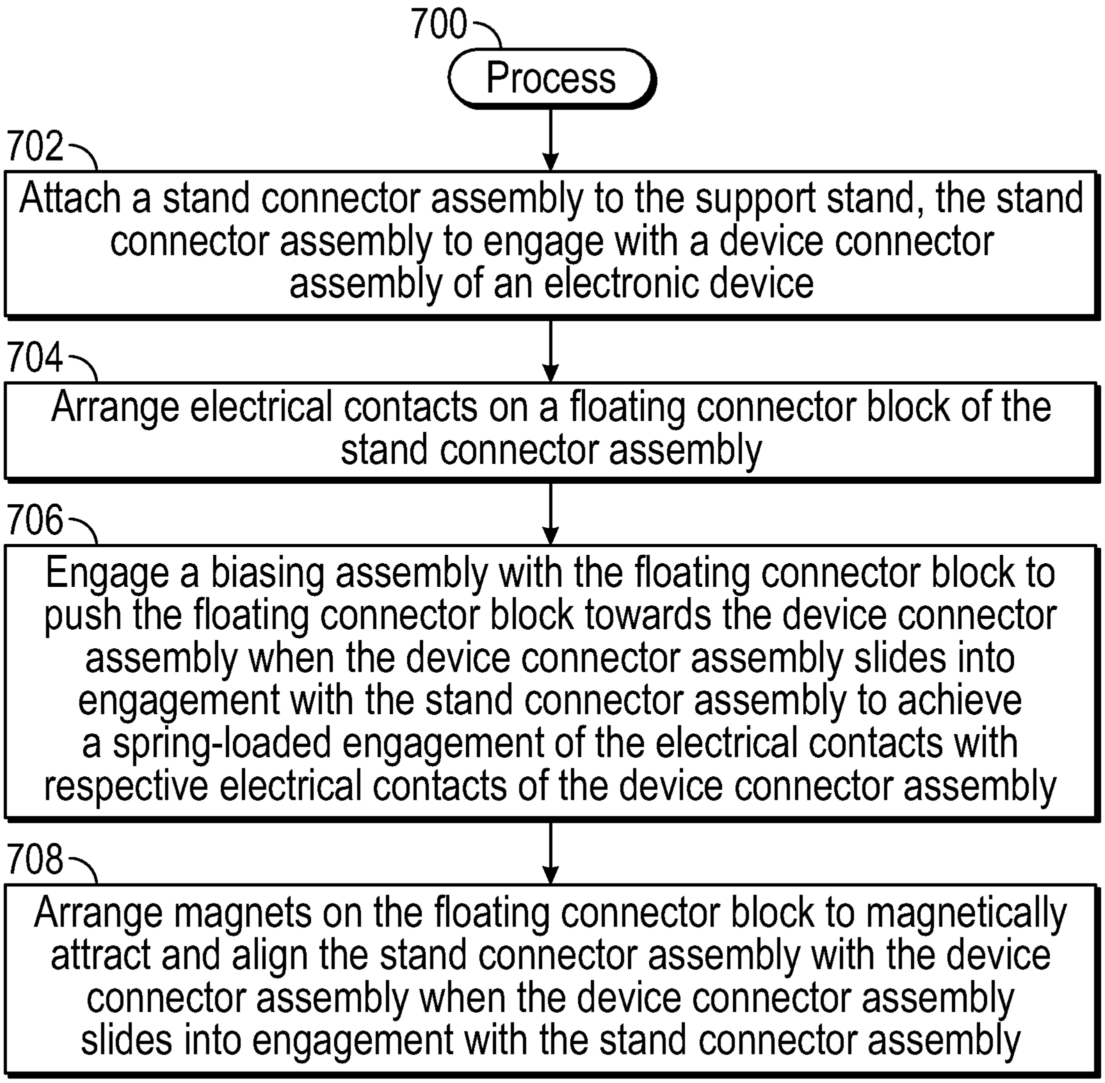
FIG. 7 is a flow diagram of a process of forming a support stand, according to some examples.

FIG. 7 is a flow diagram of a process 700 of forming a support stand according to some examples. The process 700 includes attaching (at 702) a stand connector assembly to the support stand, the stand connector assembly to engage with a device connector assembly of an electronic device.

The process 700 includes arranging (at 704) electrical contacts on a floating connector block of the stand connector assembly.

The process 700 includes engaging (at 706) a biasing assembly with the floating connector block to push the floating connector block towards the device connector assembly when the device connector assembly slides into engagement with the stand connector assembly to achieve a spring-loaded engagement of the electrical contacts with respective electrical contacts of the device connector assembly.

The process 700 includes arranging (at 710) magnets on the floating connector block to magnetically attract and align the stand connector assembly with the device connector assembly when the device connector assembly slides into engagement with the stand connector assembly.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A connection apparatus to establish an electrical connection between a support stand and an electronic device, comprising:

a first connector assembly to engage with a second connector assembly, wherein the first connector assembly is included in one of the support stand and the electronic device, and the second connector assembly is included in another one of the support stand and the electronic device, the first connector assembly comprising:

a floating connector block, an electrical contact on the floating connector block, a biasing assembly engaged with the floating connector block to urge the floating connector block towards the second connector assembly when the second connector assembly is engaged with the first connector assembly to achieve a spring-loaded engagement of the electrical contact with an electrical contact of the second connector assembly, and a locking feature to lockingly engage with a locking feature of the second connector assembly, wherein the locking feature of the first connector assembly is biased by a spring toward the locking feature of the second connector assembly, the locking feature of the first connector assembly being movable against the spring bias to clear the locking feature of the second connector assembly to allow disengagement.

2. The connection apparatus of claim 1, wherein the electrical contact of the first connector assembly is a spring-loaded electrical contact.

3. The connection apparatus of claim 1, wherein the first connector assembly comprises a first housing defining a chamber to slidably receive the second connector assembly of the electronic device.

4. The connection apparatus of claim 1, wherein the first connector assembly comprises a first housing slidably receivable in a chamber defined by a second housing of the second connector assembly.

5. The connection apparatus of claim 1, wherein the biasing assembly comprises a spring engaged with the floating connector block.

6. The connection apparatus of claim 1, wherein the biasing assembly comprises an elastic material engaged with the floating connector block.

7. The connection apparatus of claim 1, wherein the first connector assembly comprises a stop to engage with and restrict movement of the floating connector block by the biasing assembly.

8. The connection apparatus of claim 1, wherein the first connector assembly comprises a magnet to magnetically attract and align the first connector assembly with the second connector assembly when the second connector assembly is brought into engagement with the first connector assembly.

9. The connection apparatus of claim 1, wherein the first connector assembly comprises a plurality of electrical contacts on the floating connector block.

10. The connection apparatus of claim 1, wherein the locking feature of the second connector assembly is a locking slot.

11. The connection apparatus of claim 1, wherein the biasing assembly is engaged with a rear surface of the floating connector block.

12. A support stand comprising:

a mount support to detachably mount an electronic device; and a stand connector assembly to engage with a device connector assembly of the electronic device, the stand connector assembly comprising:

a floating connector block, spring-loaded electrical contacts on the floating connector block, a biasing assembly engaged with the floating connector block to urge the floating connector block towards the device connector assembly when the device connector assembly is engaged with the stand connector assembly to achieve an engagement of the spring-loaded electrical contacts with respective electrical contacts of the device connector assembly, and a locking feature to lockingly engage with a locking feature of the device connector assembly, wherein the locking feature of the stand connector assembly protrudes into the locking feature of the device connector assembly, wherein the locking feature of the device connector assembly is defined by a housing structure inside an external housing of the stand connector assembly such that the locking engagement occurs within a chamber defined by the external housing.

13. The support stand of claim 12, further comprising:

an electrical charger to electrically charge a separate device, the electrical charger electrically connected to the stand connector assembly to receive power from the stand connector assembly.

14. The support stand of claim 12, further comprising:

a stop to restrict a movement of the floating connector block once the floating connector block is engaged to the stop, wherein the biasing assembly comprises a spring engaged with the floating connector block or an elastic material engaged with the floating connector block.

15. The support stand of claim 12, wherein the biasing assembly is engaged with a rear surface of the floating connector block.

16. A method of forming a support stand, comprising:

attaching a stand connector assembly to the support stand, the stand connector assembly of the support stand to engage with a device connector assembly of an electronic device when the electronic device is mounted to a mount support of the support stand;

arranging electrical contacts on a floating connector block;

engaging a biasing assembly with the floating connector block to push the floating connector block towards the device connector assembly when the device connector assembly slides into engagement with the stand connector assembly to achieve a spring-loaded engagement of the electrical contacts with respective electrical contacts of the device connector assembly;

arranging magnets on the floating connector block to magnetically attract and align the stand connector assembly with the device connector assembly when the device connector assembly slides into engagement with the stand connector assembly; and providing a locking feature on the stand connector assembly to lockingly engage with a locking feature of the device connector assembly, and wherein the locking feature is releasable from the locking feature of the device connector assembly responsive to actuation of a release tab, wherein the release tab is configured to move the locking feature against a spring bias to clear the locking feature of the device connector assembly and allow disengagement of the device connector assembly from the stand connector assembly.

17. The method of claim 16, wherein the stand connector assembly comprises a housing defining an inner chamber that slidably receives the device connector assembly, wherein the device connector assembly is to engage with the stand connector assembly as the device connector assembly slides within the inner chamber.

18. The method of claim 16, wherein engaging the biasing assembly with the floating connector block comprises engaging the biasing assembly with a rear surface of the floating connector block.

* * * * *